US009548787B1

(12) United States Patent
Lee

(10) Patent No.: US 9,548,787 B1
(45) Date of Patent: Jan. 17, 2017

(54) INTEGRATED BUTTON ANTENNA STRUCTURE

(71) Applicant: AMAZON TECHNOLOGIES, INC., Seattle, WA (US)

(72) Inventor: Cheng-Jung Lee, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/563,876

(22) Filed: Dec. 8, 2014

(51) Int. Cl.
*H04B 1/48* (2006.01)

(52) U.S. Cl.
CPC .................................. *H04B 1/48* (2013.01)

(58) Field of Classification Search
CPC ........ H04B 5/00; H01Q 9/0407; H01Q 1/088; H04M 1/0277
See application file for complete search history.

(56) References Cited

U.S. PATENT DOCUMENTS

| | | | | |
|---|---|---|---|---|
| 2006/0119487 A1* | 6/2006 | Atkinson | ............. | G06Q 20/206 340/13.25 |
| 2008/0074329 A1* | 3/2008 | Caballero | ............. | H01Q 1/088 343/702 |
| 2008/0163663 A1* | 7/2008 | Hankey | ................... | B21C 23/18 72/348 |
| 2008/0166004 A1* | 7/2008 | Sanford | ................. | H01Q 1/243 381/375 |
| 2012/0212063 A1* | 8/2012 | Terlizzi | ................... | H04M 1/05 307/80 |
| 2012/0293010 A1* | 11/2012 | Lee | ......................... | H02J 17/00 307/104 |
| 2015/0364815 A1* | 12/2015 | Yong | ....................... | H01Q 1/50 343/702 |

* cited by examiner

*Primary Examiner* — Cindy Trandai
(74) *Attorney, Agent, or Firm* — Lowenstein Sandler LLP

(57) ABSTRACT

Antenna structures and methods of operating the same of an electronic device with an integrated power button-antenna structure are described. One apparatus includes a substrate, a first conductive trace disposed on the substrate, a second conductive trace disposed on the substrate and a switch mechanism including a non-conductive portion and a conductive portion. The switch mechanism electrically connects the first conductive trace and the second conductive trace to produce a first signal when the switch mechanism is activated. The second conductive trace forms an antenna element to radiate or receive electromagnetic energy.

19 Claims, 7 Drawing Sheets

INTEGRATED BUTTON ANTENNA STRUCTURE

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
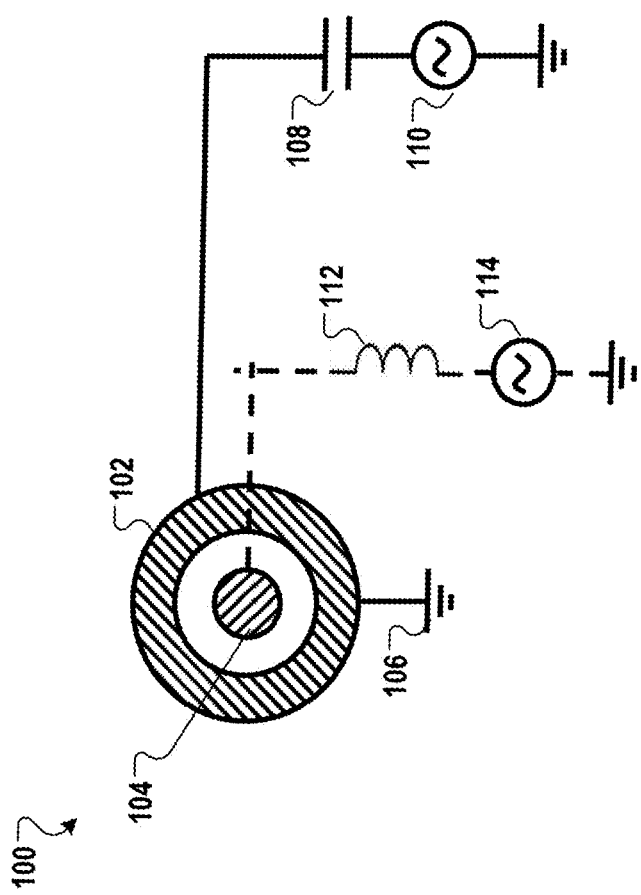
FIG. 1 is a schematic of an integrated button-antenna structure for a button operational mode and an antenna operational mode in a user device according to one embodiment.

Antenna structures and methods of operating the same of an electronic device with an integrated button-antenna structure are described. One apparatus includes a substrate, a first conductive trace disposed on the substrate, a second conductive trace disposed on the substrate and a switch mechanism with a non-conductive portion and a conductive portion. The switch mechanism may be a dome switch and a dome sheet of the dome switch may be a rubber dome coated in conductive substance. The first conductive trace may be disposed at least partially within an inner area defined by the second conductive trace. The switch mechanism electrically connects the first conductive trace and the second conductive trace to produce a first signal when the switch mechanism is activated. The second conductive trace forms an antenna element to radiate or receive electromagnetic energy.

In a constrained radiation space (low and thin profiles for mobile devices) of user devices, antenna engineers face various challenges. As the antenna volume in devices is reduced, there is a need to design more antenna elements and to use reconfigurable antennas. Typically, user devices include an antenna structure for wireless local area network (WLAN) technologies, such as the Wi-Fi® technology. It is known that utilizing multiple antennas in a user device can support faster throughput and better coverage and range. For example, multi-input-multi-output (MIMO) technology is used to create multiple transmission and receiving channels. Each antenna used in the system can be either transmitting and receiving radiator or receiving element only. To implement MIMO technology, multiple physical antennas are used in the user device. In order to create the antenna at specific frequency, e.g., 2.4 GHz for the Wi-Fi® technology, a certain physical area is reserved for this antenna. In addition, the metallic element in that area has to be minimized so the good antenna performance can be achieved. The challenge for antenna engineers today is to find a low-cost solution to properly fit an antenna or two in an already constrained space inside the user device. The embodiments described herein may use the existing metallic components in the user device as the antenna or as portion of the antenna structure. Therefore, different functions can share the same physical space without significantly impacting each other. The cost is also minimized as there is no need to create additional part for the antenna. Typically, these different functions do not operate in similar frequency ranges, making it possible to integrate portions of a push-button structure with an antenna structure to create an integrated button-antenna structure as described herein.

The antenna structures described below can be used for Wi-Fi® and Bluetooth® frequency bands or other wireless local area network (WLAN) frequency bands. In other embodiments, the integrated button-antenna structure can be utilized as one or more antenna elements in an antenna system design that supports various air interface technologies, including wide area network (WAN), WLAN, personal area network (PAN), global navigation satellite system (GNSS) technologies in a single user device design for different global markets. The WAN technologies supported may include 4G data over Long Term Evolution (LTE) with carrier aggregation of 3G data and voice, as well as 2G.

The electronic device (also referred to herein as user device) may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

FIG. 1 is a schematic of an integrated button-antenna structure 100 for a button operational mode and an antenna operational mode in a user device according to one embodiment. The integrated button-antenna structure 100 includes a dome sheet for a power button or any other type of button in the button operational mode. The dome sheet usually has a metallic inner circle 104 and a metallic outer ring 102 as generically illustrated in FIG. 1. The inner circle 104 is connected to a power button signal source 114 and the outer ring 102 is connected to a ground potential 106. As described in more detail below, the integrated button-antenna structure 100 can operate as a pushbutton, such as a power button, as well as an antenna, such as WLAN antenna as described in more detail with respect to FIG. 2 and FIG. 3.

Figure 2:
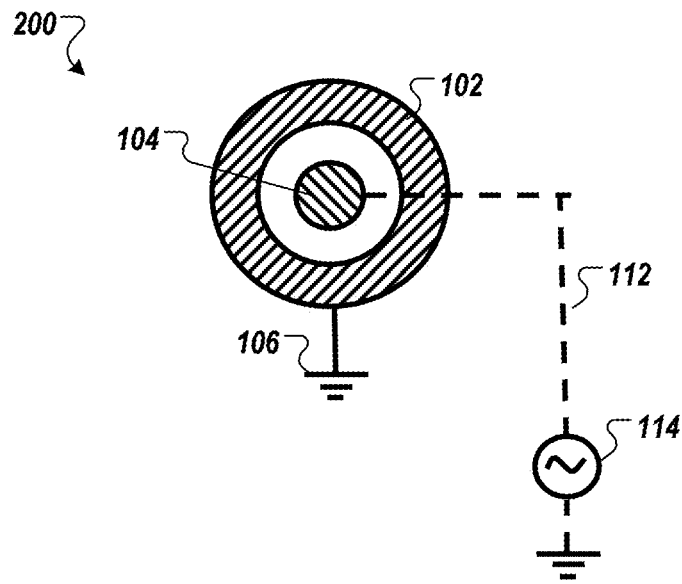
FIG. 2 is a schematic of the integrated button-antenna structure of FIG. 1 in the button operational mode according to one embodiment.

As illustrated in FIG. 2, during a button operational mode 200 of the integrated button-antenna structure 100, these two pieces of metal can be brought together when the power button is pressed by a user and the dome sheet completes a circuit loop between the power button signal source 114 and the ground potential 106. The metallic inner circle 104 and metallic outer ring 102 stay separated (i.e., electrically isolated) if the button is not pressed. At the low frequency range where the power button signal operates, the integrated button-antenna structure 100 becomes a normal power button structure as illustrated in equivalent schematic structure of FIG. 2.

Figure 3:
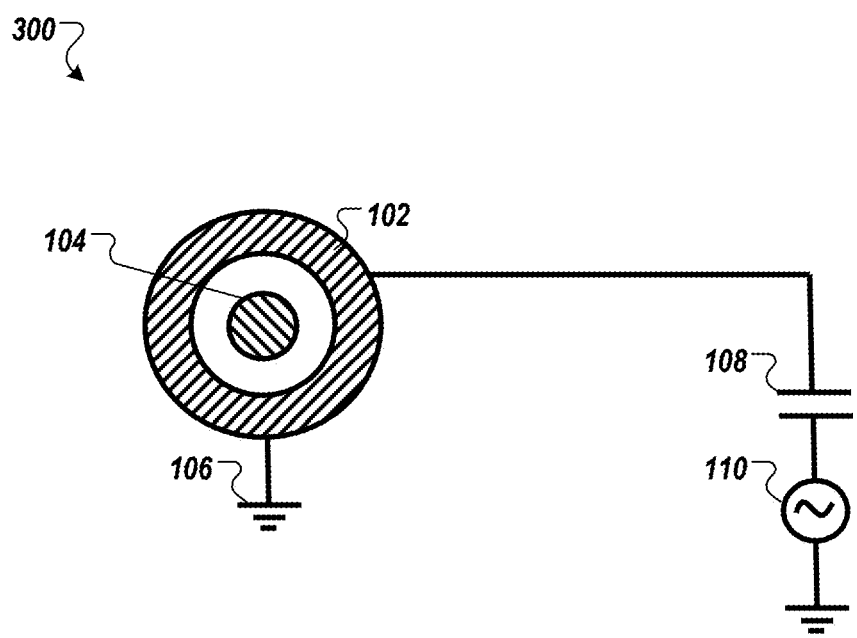
FIG. 3 is a schematic of the integrated button-antenna structure of FIG. 1 in the antenna operational mode according to one embodiment.

As illustrated in FIG. 3, during an antenna operational mode 300 of the integrated button-antenna structure 100, the same metallic outer ring 102 can be used to form an antenna element or a portion of an antenna element that can radiate or receive electromagnetic energy in a frequency range, such as 2.4 GHz range for the Wi-Fi® technologies. In the depicted embodiment, a radio frequency (RF) signal 110 (e.g., a Wi-Fi® signal) is connected to the metallic outer ring 102 with a capacitor 108 as an impedance matching component. The value of the capacitor 108 may be chosen to operate as an open circuit at a lower frequency and as a matching circuit at a higher frequency range (e.g., 2.4 GHz frequency range). A RF choke 112, such an inductor, is inserted between the power button signal source 114 and the metallic inner circle 104 of the dome sheet. The value of the RF choke 112 (e.g., inductor) is chosen to operate as a short circuit at the lower frequency range and as an open circuit at the higher frequency range (e.g., 2.4 GHz frequency range). At the higher frequency ranges, the integrated button-antenna structure 100 becomes an antenna element that can radiate, receive or both radiate and receive electromagnetic energy in the higher frequency range as illustrated in the equivalent structure schematic of FIG. 3. The antenna element includes the capacitor 108 and the metallic outer ring 102 connected to the ground potential 106. The resonant frequency and impedance matching can be optimized by changing the dimension of the metallic outer ring 102, the capacitance value of the capacitor 108, and the interconnecting trace length or width. Although the capacitor 108 is illustrated and described, other impedance matching components may be used in other embodiments. The impedance matching component (or impedance matching network) can match the impedance of the antenna element to impedances needed for the different frequency ranges, as described in more detail below.

The integrated button-antenna structure 100 can be implemented in a user device (not illustrated in FIGS. 1-3) (also referred to herein as an electronic device). The user device may be any content rendering device that includes a modem for connecting the user device to a network. Examples of such user devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

The integrated button-antenna structure 100 can be used as a primary (main) antenna, a secondary (diversity) antenna, or an auxiliary antenna. A diversity antenna is a secondary antenna that may be used along with the one or more primary antennas to improve the quality and reliability of a wireless link. There may be no clear line-of-sight between a transmitter and a receiver. Instead, a signal may undergo multiple reflections between transmission and reception. Each reflection may introduce time delays, phase shifts, distortions, attenuations, etc. that can degrade a signal quality. The diversity antennas have a different location and/or configuration than the primary antennas on the user device, and may therefore experience different phase shifts, time delays, attenuations, distortions, etc. Accordingly, signals at the diversity antenna can be compared to signals at the primary antenna to determine and mitigate such effects. For example, the integrated button-antenna structure 100 can be used as a PAN or WLAN antenna having a length and size optimized for 2.4 GHz RF signals (e.g., for Bluetooth®, Wi-Fi® networks, or the like). In another embodiment, the integrated button-antenna structure 100 may be a GPS antenna having a length and size optimized for RF signals in the range of about 1400 MHz to about 1600 MHz. There are numerous other antenna selections that may be used in various button structures of user devices.

Figure 4:
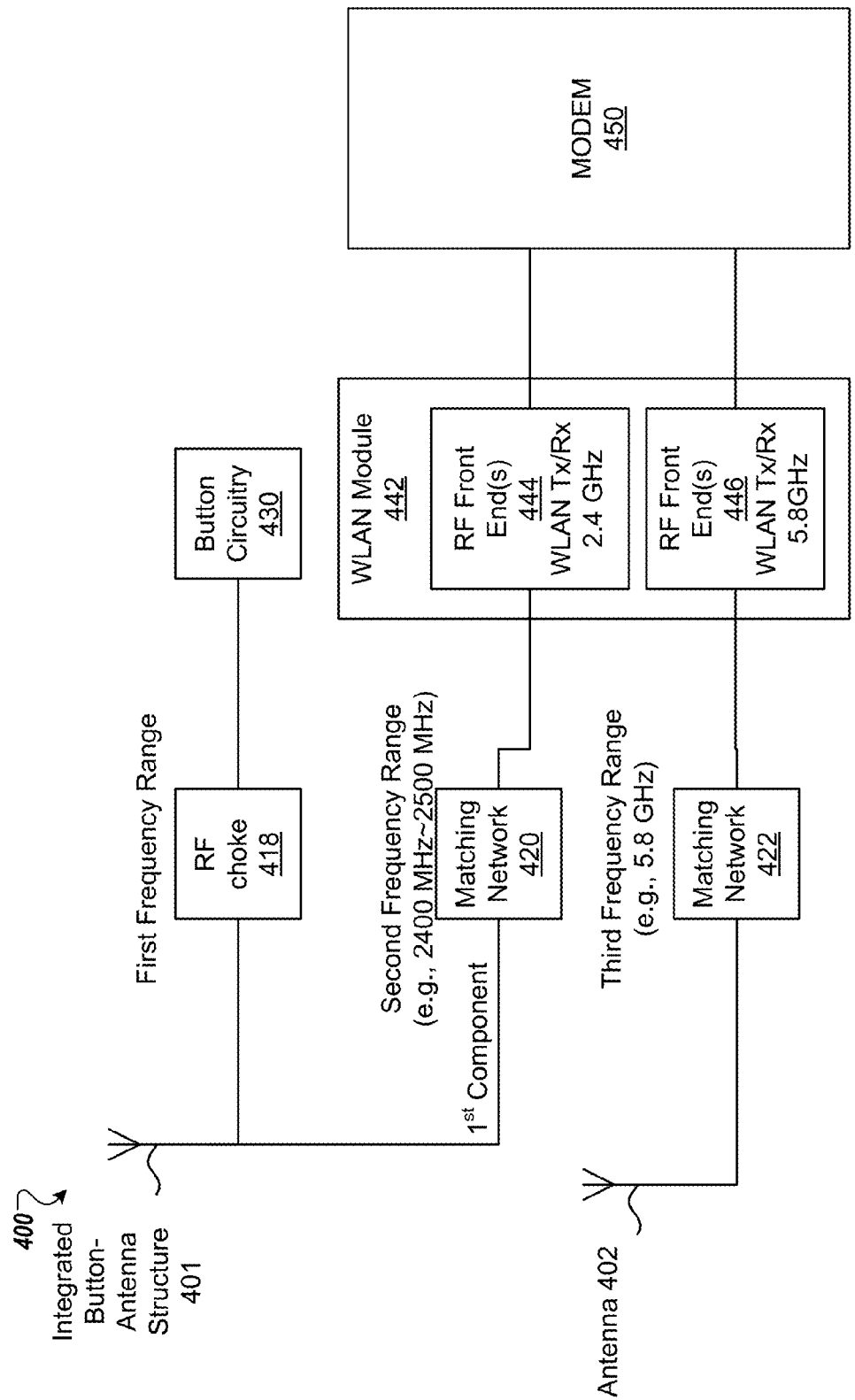
FIG. 4 is a block diagram of an antenna architecture with an integrated button-antenna structure and a second antenna according to one embodiment.

FIG. 4 is a block diagram of an antenna architecture 400 with an integrated button-antenna structure 401 and a second antenna 402 according to one embodiment. The integrated button-antenna structure 401 is coupled to a RF choke 418, which is coupled to button circuitry 430 (also referred to as a first circuit). The button circuitry 430 may be an integrated circuit disposed on a PCB of the user device. Alternatively, the button circuitry 430 may be integrated in another device, such as a processor, disposed on the PCB. The integrated button-antenna structure 401 is also coupled to an impedance matching network 420, which is coupled to a WLAN module 442 (also referred to as a second circuit or RF circuit). The WLAN module 442 being coupled to a modem 250. The WLAN module 442 may be a RF module for connecting to wireless access point of a local area network. Alternatively, other RF circuitry, such as a WAN module can be used for connecting to base stations of a wireless carrier. The WLAN module 442 may include one or multiple RF front end circuits (RFFEs) (also referred to as RF circuitry). The RFFEs may include receivers and/or transceivers, filters, amplifiers, mixers, switches, and/or other electrical components. One example of an RF front end is described with reference to FIG. 4. In another embodiment, a GPS receiver (not illustrated in FIG. 2) can be used to receive GPS data using radio waves in the GPS band (approximately 1575 MHz) via a GPS antenna.

In other embodiments, the WLAN module 442 may include one or more transmitters and/or transceivers, and may additionally include one or more primary receivers and/or secondary receivers. For example, a first transceiver may transmit and receive signals tuned to a first band (e.g., approximately 2400 MHz-2500 MHz in one embodiment) and a second transceiver may transmit and receive signals tuned to a second band (e.g., approximately 5000 MHz-6000 MHz in one embodiment). As illustrated, the WLAN module 442 includes RF front-end circuitry (RFFE) 444 to operate in a 2.4 GHz frequency band and RFFE 446 to operate in a 5.8 GHz frequency band. A WLAN primary transceiver and secondary RF receiver may allow the user device to receive data using radio waves in the WLAN bands via one or more antennas. The WLAN module 442 may be a separate integrated circuit than the button circuitry 430.

In the depicted embodiment, the WLAN module includes RF circuitry configured to communicate data to one or more other devices using transmissions complying with specific communication protocols. Additionally, each RF module may be configured to radiate or receive electromagnetic energy (e.g., RF signals) in different frequency bands. Some RF modules may include multiple transceivers, transmitters and/or receivers, and may support multiple-input multiple-output (MIMO) functionality. In other embodiments, the antenna architecture may include additional RF modules and/or other communication modules, such as a wireless local area network (WLAN) module, a GPS receiver, a near field communication (NFC) module, the Zigbee® module, an amplitude modulation (AM) radio receiver, a frequency modulation (FM) radio receiver, a personal area network (PAN) module (e.g., a Bluetooth® module), a Global Navigation Satellite System (GLASS) receiver, or the like.

The button circuitry 430 supports button operations on the combined button-antenna structure 401 as described herein. For example, when the pushbutton is a power button, the button circuitry 430 can power-on or power-off the user device. The button circuitry 430 operates in a first frequency range that is less than a second frequency range at which the WLAN module 442 operates. The RF choke 418, which is coupled between a button trace connected to (or integrated as part of) the integrated button-antenna structure 401 and the button circuitry 430. The RF choke 418 operates as a short circuit for button signals on the button trace within a first frequency range. In one embodiment, the first frequency range goes from direct current (DC) up to 10 MHz or so based on the size of the RF choke 418. In theory, the RF choke 418 can be selected to cutoff frequencies at which the RF circuit operates. In one embodiment, the RF choke 418 is an inductor with a value between 30-200 nH to operate as a short circuit for button signals on the button trace. The RF choke 418 also operates as an open circuit for antenna signals on the button trace within a second frequency range (e.g., 2400 MHz-2500 MHz). For example, the second frequency range may be the 2.4 GHz Wi-Fi® frequency band. The impedance matching network 420, which is coupled to an antenna trace coupled to the integrated button-antenna structure 401, may include a series capacitor, or other matching component. The series capacitor operates as an open circuit for the button signals within the first frequency range. Also, the series capacitor matches an impedance of the integrated button-antenna structure 401 (i.e., the antenna element) to an impedance of the RFFE 444 (or other RF circuit) for the antenna signals within the second frequency range (e.g., 2400 MHz-2500 MHz). It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. In other embodiments, other frequency ranges may be achieved based on the design of the antenna trace. For example, the integrated button-antenna structure 401 can be desired to cover the 5 GHz frequency band for dual-band Wi-Fi® frequency bands. Alternatively, the integrated button-antenna structure 401 can be sized for low-band, mid-band, and/or high-band WAN frequency bands.

In one embodiment, the integrated button-antenna structure 401 is connected to impedance matching network 420 that is on transmit/receive paths between the integrated button-antenna structure 401 and the respective RF circuitry (WLAN module 442). A second antenna 402 may be connected to an impedance matching network 422 that is on a transmit/receive path between the second antenna 402 and the RF circuitry (WLAN module 442). The impedance matching network 422 is to match an impedance of the second antenna 402 to an impedance of the RFFE 446 to a impedance of the WLAN module 442 to radiate or receive electromagnetic energy in with a third frequency range (e.g., 5000 MHz to 6000 MHz). Alternatively, some of the impedance matching networks may be omitted for one or more of the transmit/receive paths. Impedance matching networks 420, 422 may be fixed impedance matching networks or may be reconfigurable impedance matching networks. Each antenna may be optimized or tuned for a particular frequency range or for multiple frequency ranges as described herein. In other words, an antenna may have an impedance that is matched to an impedance of the respective RF circuitry to radiate or receive electromagnetic energy in a particular frequency band. A reconfigurable impedance matching network may be reconfigured to tune the antenna to the frequency range at which it will be used. Alternatively, a fixed impedance matching network may be connected to a transmit/receive path at the input of a RF module. The fixed impedance matching network may be bypassed for connection to some antennas, and may be used for connections to other antennas.

In the depicted embodiment, the WLAN module 442 includes RF front-end circuitry (RFFE) circuitry 420 for transmission and receive (Tx/Rx) in a 2.4 GHz frequency band and RFFE circuitry 422 for Tx/Rx in a 5.8 GHz frequency band for the dual-band Wi-Fi® frequency bands. Because of the button circuitry 430 and WLAN module 442 operate in different frequency bands, the button circuitry 430 and WLAN module 442 permit use of the integrated button-antenna structure 401 for button operations and for RF communications. That is the button circuitry 430 can use the integrated button-antenna structure 401 as a pushbutton and the WLAN module (RF circuitry) can use the same integrated button-antenna structure 401 as an antenna element for RF communications.

In another embodiment, a WLAN module may be used for WLAN communications. For example, the WLAN module may include a WLAN RF transceiver for communications on one or more Wi-Fi® bands (e.g., 2.4 GHz and 5 GHz).

The modem 250 allows the user device to handle both voice and non-voice communications (such as communications for text messages, multimedia messages, media downloads, web browsing, etc.) with a wireless communication system. The modem 140 may provide network connectivity using any type of digital mobile network technology. In the depicted embodiment, the modem 250 can use the RFFE circuitry 420, 422 to radiate or receive electromagnetic energy via the integrated button-antenna structure 401 and the second antenna 402 to communication data to and from the user device in the respective frequency ranges. In other embodiments, the modem 250 may communicate according to different communication types (e.g., WCDMA, GSM, LTE, CDMA, WiMAX, etc.) in different cellular networks.

Figure 5:
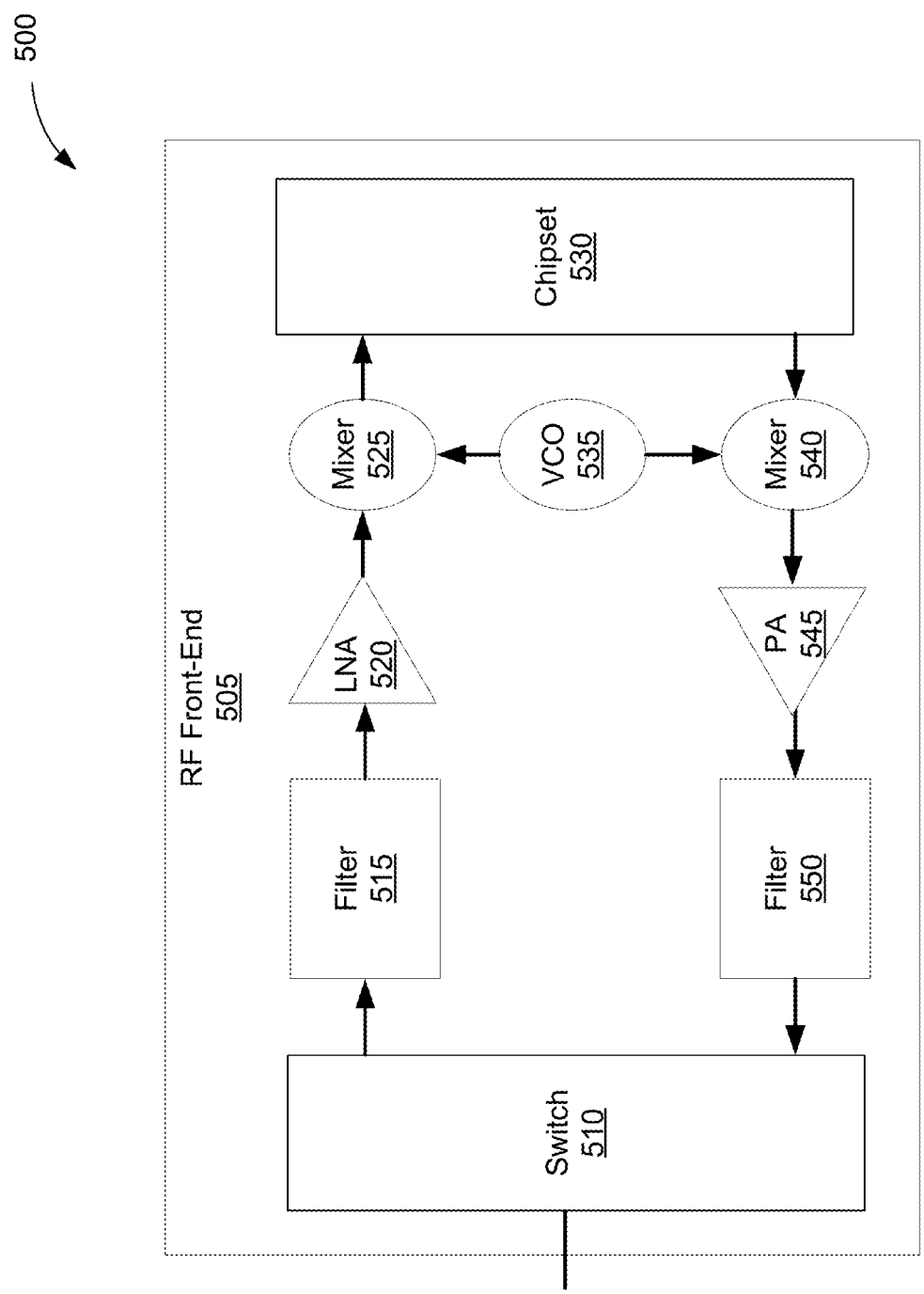
FIG. 5 is a block diagram of RF front-end circuitry for a RF module according to one embodiment.

FIG. 5 is a block diagram of RF front-end circuitry 505 for a RF module according to one embodiment. In one embodiment, the RF front-end circuitry 505 includes a switch 510 to switch between a send and a receive path. The RF front-end circuitry 505 additionally includes a filter 515 on the receive path and a filter 550 on the send path. The filters 515, 550 may be band pass filters (BPF) to pass a particular frequency range used by chipset 530. For example, if chipset 530 is a WLAN transceiver, then filters 515 may be 2.4 GHz band pass filters. Chipset 530 may be, for example, a WLAN transceiver chipset, a WAN transceiver chipset, a WAN receiver chipset, a GPS receiver chipset, and so forth. After the filter 515 on the receiver path is a low noise amplifier (LNA) 520 to amplify the filtered signal. LNA 520 is followed by a mixer 525, which mixes the filtered and amplified signal with a signal from a voltage controlled oscillator (VCO) 535. The mixed signal is provided to chipset 530.

On the send path, the chipset 530 outputs a signal to mixer 540. Mixer 540 mixes the signal with a signal from VCO 535. Mixer 540 provides the mixed signal to a power amplifier (PA) 545. The power amplifier 545 amplifies the signal and provides the amplified signal to filter 550. Filter 550 then filters the signal and provides the filtered signal to switch 510 for transmission via an attached antenna. It should be noted that in other embodiments, the filters 515, 550 can be disposed on the other side of the switch 510.

Figure 6:
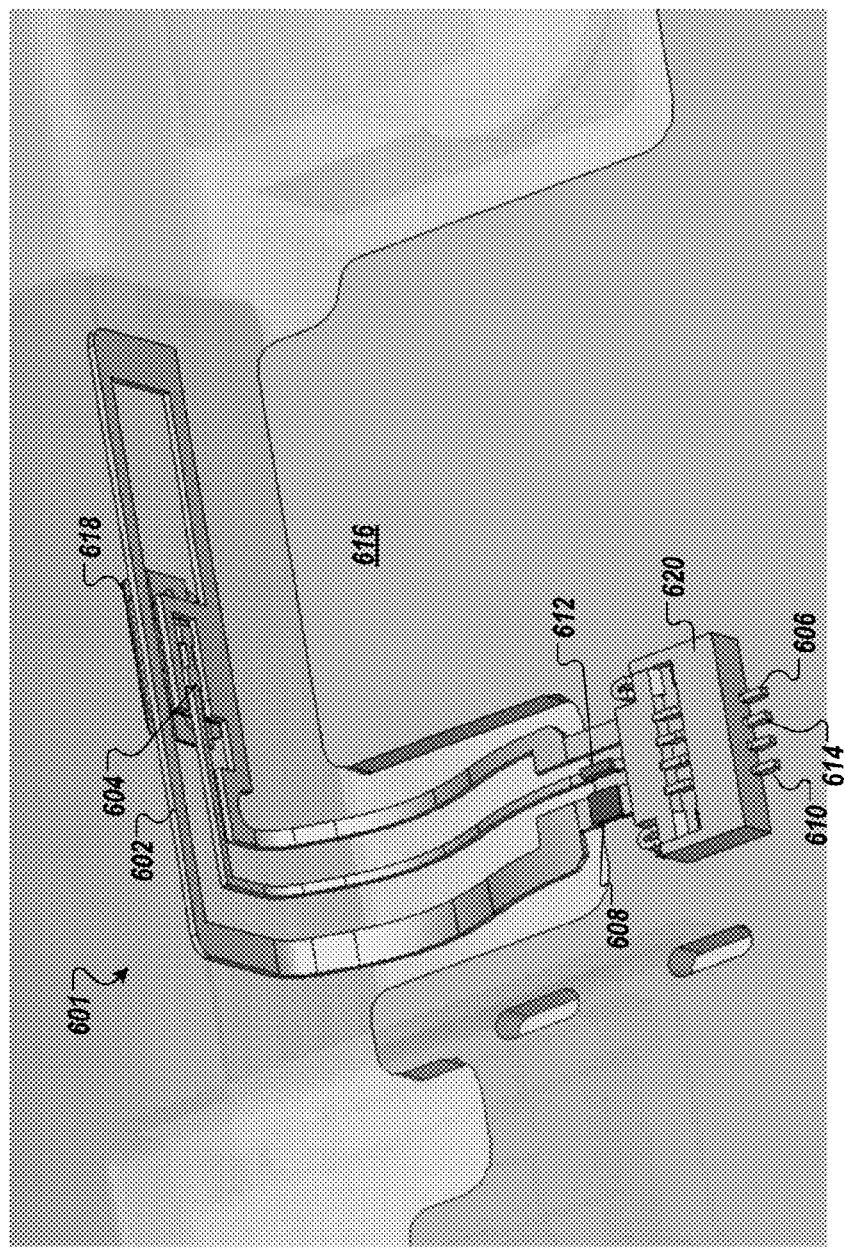
FIG. 6 is an integrated button-antenna structure according to another embodiment.

FIG. 6 is an integrated button-antenna structure 601 of a user device 600 according to another embodiment. The integrated button-antenna structure 601 is disposed on a first side of the user device 600 (e.g., a tablet device). Within the tablet device is a printed circuit board (PCB) 616 upon which a connector 620 is disposed. The integrated button-antenna structure 601 is printed on a single layer flex substrate (also referred to as "flex" or "flex circuit") that connects to the PCB 616 through the connector 620. The connector 620 may be a zero insertion force (ZIF) connector. Alternatively, other types of connectors can be used. Also, in other embodiments, the integrated button-antenna structure 601 can be implemented on other circuit boards, antenna carriers, dielectric materials, or the like.

In the depicted embodiment, the connector 620 includes four useable pins on the connector 620. A first pin 610 of the connector 620 connects an RF feed of RF circuitry on the PCB 616 to an antenna trace 602 on the flex substrate. The RF feed may be an antenna signal source (e.g., Wi-Fi® signal source) or an antenna signal receiver. A second pin 614 of the connector 620 connects a button input of button circuitry on the PCB 616 to a button trace 604 on the flexible substrate. The button circuitry may be a button signal source. A third pin 606 of the connector 620 connects a ground potential to a grounding point of the antenna trace 602.

In this depicted embodiment, a series capacitor 608 is also printed on the flex substrate and is inserted between the first pin 610 and the antenna trace 602. An inductor 612 is inserted between the second pin 614 and the button trace 604. A dome switch 618 has an outer portion and an inner pad. The outpour portion is connected to the antenna trace 602 and the inner pad is connected to the button trace 604. In one embodiment, the outer portion has a U-shape trace. A portion of the button trace 604 extends into an opening of the U-shape trace such that the dome switch 618 electrically connects the portion of the button trace and the U-shape trace to produce the first signal when the dome switch 618 is activated.

In the antenna operational mode, an antenna element is formed by the antenna trace 602, capacitor 608, and the outer portion of the dome switch 618. The antenna resonant frequency and impedance matching is determined by the antenna trace length, width, capacitor value, the dimension of the dome sheet outer portion part. In the depicted embodiment, the antenna resonant frequency is about 2.4 GHz for operation in the 2.4 GHz. Wi-Fi® frequency band. Alternatively, the antenna resonant frequency can be tuned to other frequency ranges for other frequency bands.

Figure 7:
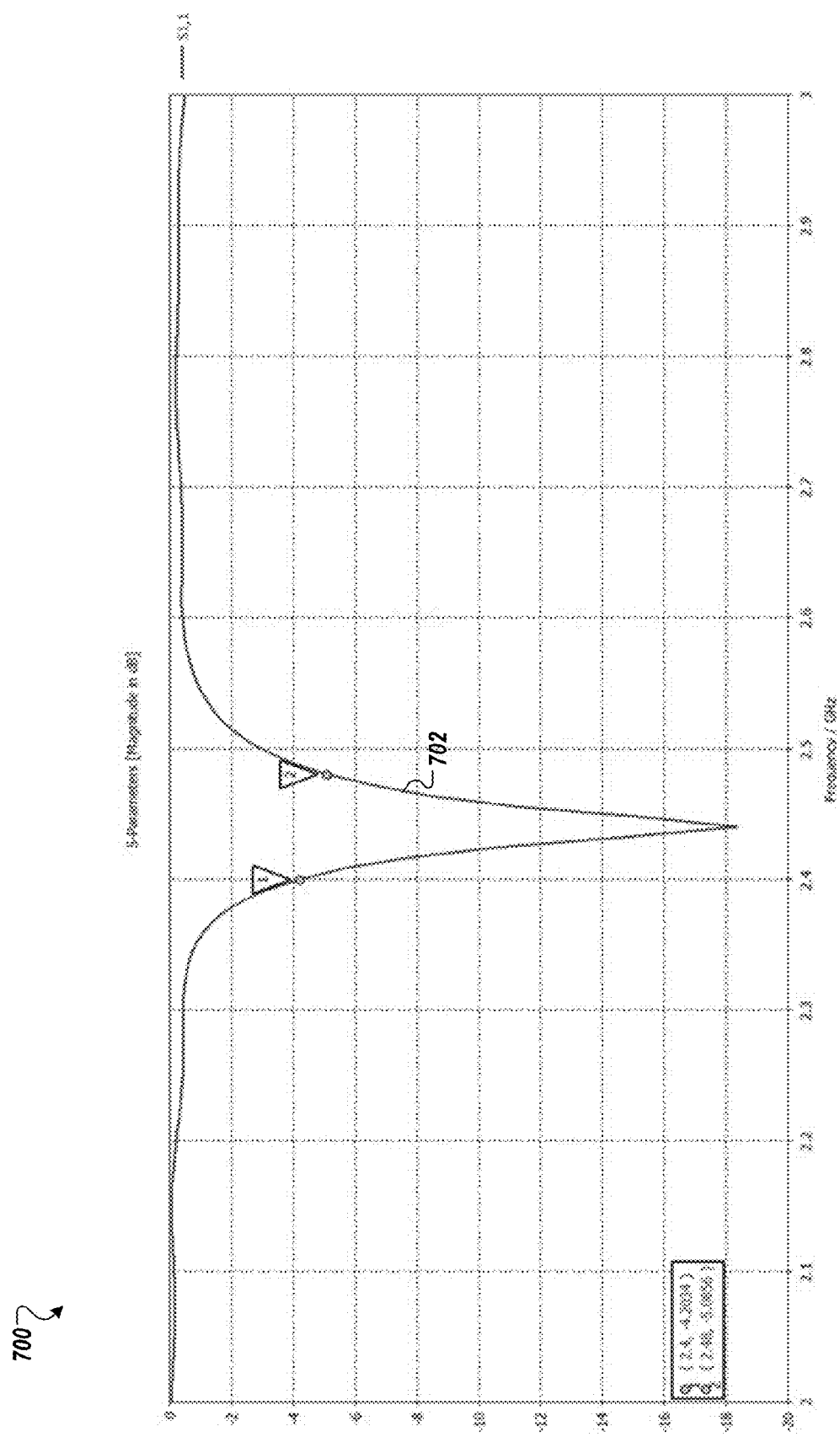
FIG. 7 is a graph of return loss of the integrated button-antenna structure of FIG. 6 in the antenna operational mode according to one embodiment.

FIG. 7 is a graph 700 with return loss and isolation of the integrated button-antenna structure of FIG. 6 in the antenna operational mode according to one embodiment. The graph 700 shows the return loss 702 of the integrated button-antenna structure 601. The graph 700 illustrates that the integrated button-antenna structure 601 can be caused to radiate or receive electromagnetic energy in a second frequency range between approximately 2400 MHz to approximately 2500 MHz integrated button-antenna structure 601 can still operate as a pushbutton. The integrated button-antenna structure 601 can be used as a transmitting and receiving antenna or a receiving antenna (diversity antenna).

In another embodiment, an electronic device includes a PCB with RF circuitry and pushbutton circuitry and an integrated button-antenna structure electrically coupled to the PCB. The integrated button-antenna structure operates as an antenna and a pushbutton. In one embodiment, the integrated button-antenna structure includes a dome switch, an antenna trace, and a button trace. The dome switch includes first electrode and a second electrode. The first electrode may a metallic pad and the second electrode may be a metallic ring that surrounds the first metallic pad, such as illustrated in FIG. 6. Alternatively, the first and second electrodes can be other shapes and can be disposed in other configurations for the pushbutton. A proximal end of the antenna trace is coupled to a RF feed terminal disposed on the PCB and a distal end of the antenna trace is coupled to a ground terminal disposed on the PCB. The RF feed terminal is coupled to the RF circuitry. The antenna trace is coupled to the second electrode at a first connection point between the proximal end and the distal end of the antenna trace. A proximal end of the button trace is coupled to an input terminal of the button circuitry and a distal end of the button trace is coupled to the first electrode at a second connection point. The dome switch produces a button signal on the button trace when the dome switch is activated. The RF circuitry radiates or receives a RF signal on the second electrode and antenna trace when the dome switch is not activated.

In a further embodiment, the RF circuitry radiates or receives electromagnetic energy in a WLAN frequency band. An operating frequency of the button signal is less than the WLAN frequency band. A RF choke is coupled between the button trace and the button input. The RF choke operates as a short circuit for button signals within a first frequency range and as an open circuit for antenna signals within a second frequency range. The second frequency range is higher than the first frequency range. A series capacitor is coupled to the antenna trace and the RF feed terminal. The series capacitor operates as an open circuit for the button signals within the first frequency range and as an impedance matching component for the antenna signals within the second frequency range.

In another embodiment, the integrated button-antenna structure includes a substrate, a first conductive trace disposed on the substrate, a second conductive trace disposed on the substrate, and a switch mechanism comprising a non-conductive portion and a conductive portion. The first conductive trace may be disposed at least partially within an inner area defined by the second conductive trace. The switch mechanism electrically connects the first conductive trace and the second conductive trace to produce a first signal when the switch mechanism is activated. The second conductive trace forms an antenna element to radiate or receive electromagnetic energy. In a further embodiment, a feeding point is coupled to a first end of the second conductive trace and a button input is coupled to a first end of the first conductive trace. A grounding point is coupled to a second end of the second conductive trace. A RF choke is coupled between the button input and the first conductive trace. As described herein, the RF choke electrically connects the first conductive trace to the button input for button signals within a first frequency range and electrically isolates the first conductive trace from the button input for antenna signals within a second frequency range. A matching component is coupled between the feeding point and the second conductive trace. The matching component matches an impedance of the antenna element to an impedance of RF circuitry used to radiate or receive electromagnetic energy in the second frequency range. Also, the matching component electrically isolates the second conductive trace from the feeding point for button signals within the first frequency range. In one embodiment, the RF choke is an inductor and the matching component is a capacitor. Alternatively, other components may be used to electrically connect and electrically isolate signals for the different operations of the pushbutton and the antenna element as described herein.

In a further embodiment, the second portion of the second conductive trace includes a U-shape trace and the first portion at a second end of the second conductive trace extends into an opening of the U-shape trace such that the dome switch electrically connects the first portion and the U-shape trace to produce the first signal when the dome is pressed. The second conductive trace forms a loop element. A first end of the loop element connects to the feeding point, extends in a first direction towards a first fold, extends from the first fold to a second fold in a second direction, extends from the second fold to a third fold in a third direction that is opposite the first direction, extends from the third fold to a fourth fold in a fourth direction that is opposite the second direction, and extends from the fourth fold to the grounding point in the third direction. In one embodiment, the U-shape trace is connected to the loop element between the third fold and the fourth fold. The first conductive trace extends from a point on the loop element between the third and fourth fold in the first direction to a fifth fold and extends from the fifth fold to the second end of the first conductive in the fourth direction.

In another embodiment, an electronic device includes a housing and circuit board disposed within the housing. The circuit board includes a first circuit that performs one or more button operations and a RF circuit that communicates data to or from another device. A dome switch is disposed in an opening of the housing at a first side of the electronic device. The dome switch includes a first electrode and a second electrode disposed on a substrate. The first electrode is coupled to the first circuit via a button trace. The second electrode is coupled to a ground terminal on the circuit board via a grounding trace. The dome switch also includes a tactile dome disposed above at least portions of the first electrode and the second electrode. A conductive trace is coupled to a RF feed on the circuit board and coupled to the second ground and the ground trace. The RF circuit is operable to radiate or receive electromagnetic energy via an antenna element, which includes the conductive trace, second electrode and ground trace.

In a further embodiment, a connector is disposed on the circuit board. The connector includes a button terminal coupled to the first circuit, a RF terminal coupled to the RF feed of the RF circuit, and a ground terminal. An RF choke is disposed on the substrate between the button trace and the button terminal and a matching component is disposed on the substrate between the conductive trace and the RF terminal. The RF choke operates as a short circuit for button signals on the button trace within a first frequency range and as an open circuit for antenna signals on the button trace within a second frequency range. The matching component operates as an open circuit for the button signals within the first frequency range and matches an impedance of the antenna element to an impedance of the RF circuit for the antenna signals within the second frequency range. As described herein, the RF choke is an inductor and the matching component is a capacitor. In one embodiment, the second frequency range is approximately 2400 MHz to approximately 2500 MHz.

Figure 8:
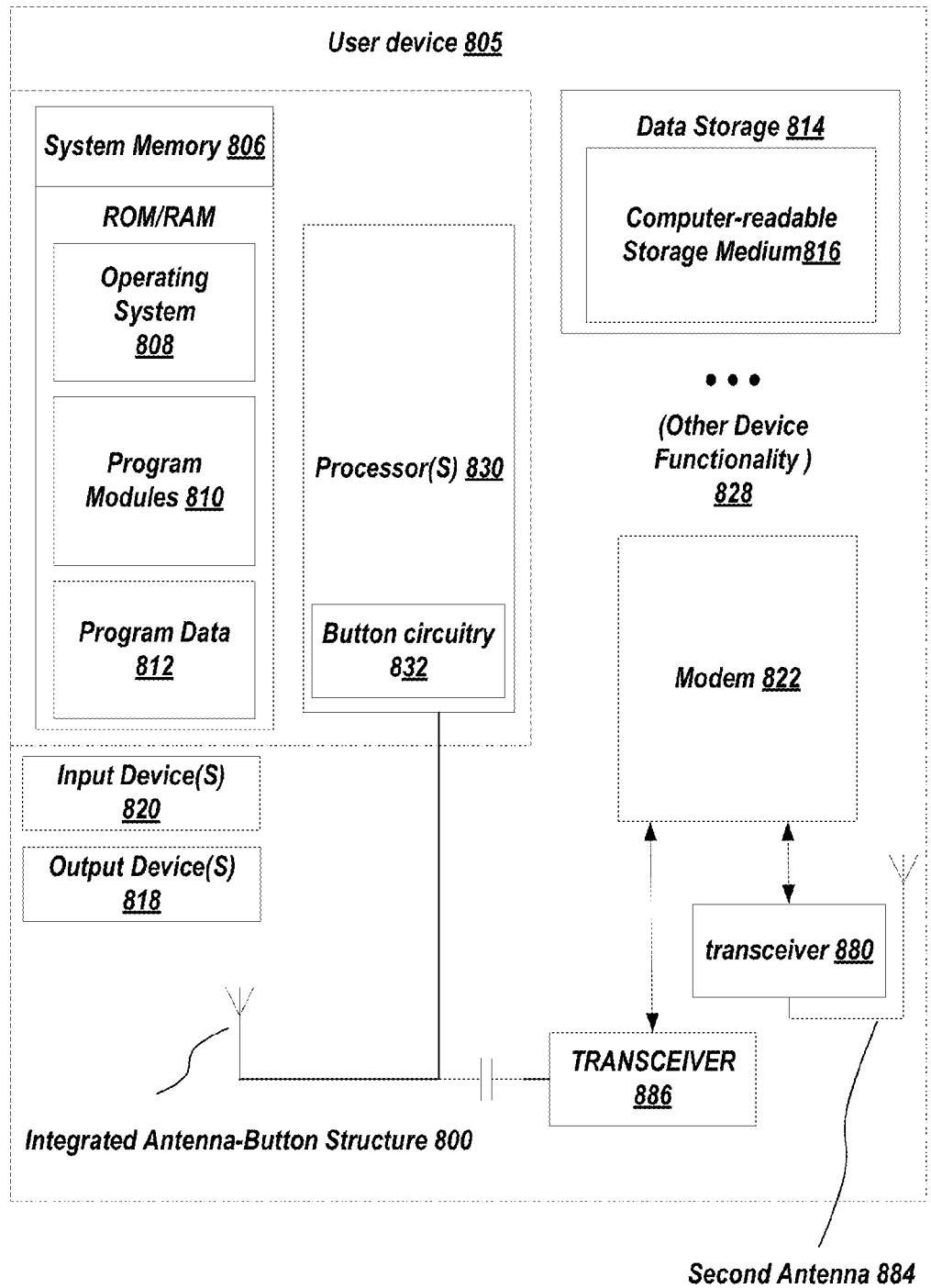
FIG. 8 is a block diagram of a user device in which embodiments of an integrated button-antenna structure may be implemented.

FIG. 8 is a block diagram of a user device 805 in which embodiments of an integrated button-antenna structure 800 may be implemented. The user device 805 may correspond to the user device 600 of FIG. 6 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 805 includes one or more processor(s) 830, such as one or more CPUs, microcontrollers, field programmable gate arrays, or other types of processors. The user device 805 also includes system memory 806, which may correspond to any combination of volatile and/or non-volatile storage mechanisms. The system memory 806 stores information that provides operating system component 808, various program modules 810, program data 812, and/or other components. The user device 805 performs functions by using the processor(s) 830 to execute instructions provided by the system memory 806.

The user device 805 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the user device 805, the system memory 806 and the processor(s) 830 also constituting computer-readable media. The user device 805 may also include one or more input devices 818 (keyboard, mouse device, specialized selection keys, etc.) and one or more output devices 820 (displays, printers, audio output mechanisms, etc.).

The user device 805 further includes a modem 822 to allow the user device 805 to communicate via a wireless network (e.g., such as provided by the wireless communication system) with other computing devices, such as remote computers, an item providing system, and so forth. The modem 822 can be connected to transceivers 880, 886, which are coupled to the second antenna 884 and the integrated button-antenna structure 800. The integrated button-antenna structure 800 may be any of the embodiments described herein. The processor 830 may include button circuitry 832 that is also connected to the integrated button-antenna structure 800. The modem 822 allows the user device 805 to handle both voice and non-voice communications (such as communications for text messages, multimedia messages, media downloads, web browsing, etc.) with a wireless communication system (not illustrated). The modem 822 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc. The modem 822 may generate signals and send these signals to antennas 800, 884 via transceivers or other RF modules or RF circuitry as described herein. User device 805 may additionally include one or more WLAN modules, WAN modules, GPS receivers, PAN transceivers and/or other RF modules. These RF modules may additionally or alternatively be connected to one or more of antennas. Antennas 800, 884 may be configured to transmit in different frequency bands and/or using different wireless communication protocols. The antennas 800, 884 may be directional, omnidirectional, or non-directional antennas. In addition to sending data, antennas 800, 884 may also receive data, which is sent to appropriate RF modules connected to the antennas.

In one embodiment, the user device 805 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 822 is shown to control transmission and reception via antenna structures (800, 884), the user device 805 may alternatively include multiple modems, each of which is configured to transmit/receive data via a different antenna and/or wireless transmission protocol.

The user device 805 delivers and/or receives items, upgrades, and/or other information via the network. For example, the user device 805 may download or receive items from an item providing system. The item providing system receives various requests, instructions and other data from the user device 805 via the network. The item providing system may include one or more machines (e.g., one or more server computer systems, routers, gateways, etc.) that have processing and storage capabilities to provide the above functionality. Communication between the item providing system and the user device 805 may be enabled via any communication infrastructure. One example of such an infrastructure includes a combination of a wide area network (WAN) and wireless infrastructure, which allows a user to use the user device 805 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 805.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 805 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 805 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, integrated, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   a printed circuit board (PCB) comprising radio frequency (RF) circuitry and power button circuitry; and
   an integrated power button-antenna structure electrically coupled to the PCB, the integrated power button-antenna structure to operate as an antenna and a power button, wherein the integrated power button-antenna structure comprises:
   a dome switch comprising a first electrode and a second electrode;
   an antenna trace comprising a proximal end and a distal end, the proximal end coupled to a RF feed terminal disposed on the PCB and the distal end coupled to a ground terminal disposed on the PCB, wherein the RF feed terminal is coupled to the RF circuitry, and wherein the antenna trace is directly connected to the second electrode at a first connection point between the proximal end and the distal end of the antenna trace; and
   a button trace comprising a proximal end and a distal end, the proximal end of the button trace coupled to an input terminal of the power button circuitry and the distal end of the button trace coupled to the first electrode at a second connection point, wherein the dome switch is operable to produce a power on-off signal on the button trace when the dome switch is activated, and wherein the RF circuitry is operable to radiate or receive a RF signal via the second electrode and the antenna trace when the dome switch is not activated.

2. The electronic device of claim 1, wherein the RF circuitry is operable to radiate or receive electromagnetic energy in a wireless local area network (WLAN) frequency band, and wherein a frequency of the power on-off signal is lower than the WLAN frequency band.

3. The electronic device of claim 1, further comprising:
   a RF choke coupled between the button trace and the power button circuitry, wherein the RF choke operates as a short circuit for power on-off signals within a first frequency range and as an open circuit for antenna signals within a second frequency range, the second frequency range being higher than the first frequency range; and
   a series capacitor coupled to the antenna trace and the RF feed terminal, wherein the series capacitor operates as an open circuit for the power on-off signals within the first frequency range and as an impedance matching component for the antenna signals within the second frequency range.

4. The electronic device of claim 1, wherein the integrated power button-antenna structure is printed on the PCB.

5. The electronic device of claim 1, wherein the integrated power button-antenna structure is printed on a flex circuit that connects to a zero insertion force (ZIF) connector of the PCB, wherein the ZIF connector comprises the RF feed terminal, the input terminal, and ground terminal.

6. An apparatus comprising:
   a substrate;
   a first conductive trace disposed on the substrate;
   a second conductive trace disposed on the substrate; and
   a switch mechanism comprising a non-conductive portion and a conductive portion, wherein the switch mechanism electrically connecting the first conductive trace and the second conductive trace to produce a first signal when the switch mechanism is activated, and wherein the second conductive trace forms an antenna element to radiate or receive electromagnetic energy;
   a feeding point coupled to a first end of the second conductive trace;
   a button input coupled to a first end of the first conductive trace;
   a grounding point coupled to a second end of the second conductive trace;
   a radio frequency (RF) choke coupled between the button input and the first conductive trace, the RF choke being operable to electrically connect the first conductive trace to the button input for button signals within a first frequency range and to electrically isolate the first conductive trace from the button input for antenna signals within a second frequency range, wherein the second frequency range is higher than the first frequency range; and
a matching component coupled between the feeding point and the second conductive trace, the matching component being operable to match an impedance of the antenna element to an impedance of RF circuitry used to radiate or receive electromagnetic energy in the second frequency range, and wherein the matching component is operable to electrically isolate the second conductive trace from the feeding point for button signals within the first frequency range.

7. The apparatus of claim 6, wherein the RF choke is an inductor and the matching component is a capacitor.

8. The apparatus of claim 6, wherein the second frequency range is approximately 2400 MHz to approximately 2500 MHz.

9. The apparatus of claim 6, wherein the second conductive trace comprises a U-shape trace, and wherein a second end of the first conductive trace extends into an opening of the U-shape trace such that the switch mechanism electrically couples the first conductive trace to the U-shape trace to produce the first signal when the switch mechanism is activated.

10. The apparatus of claim 9, wherein the second conductive trace is formed as a loop element that connects to the feeding point at the first end, extends in a first direction towards a first fold, extends from the first fold to a second fold in a second direction, extends from the second fold to a third fold in a third direction that is opposite the first direction, extends from the third fold to a fourth fold in a fourth direction that is opposite the second direction, and extends from the fourth fold to the grounding point in the third direction.

11. The apparatus of claim 10, wherein the U-shape trace is connected to the loop element between the third fold and the fourth fold, and wherein the first conductive trace extends from a point on the loop element between the third fold and the fourth fold in the first direction to a fifth fold and extends from the fifth fold to the second end of the first conductive in the fourth direction.

12. The apparatus of claim 9, wherein the first conductive trace is a metallic pad and the second conductive trace is a metallic ring that surrounds the metallic pad.

13. The apparatus of claim 12, further comprising a circuit board, the circuit board comprising a connector connected to the substrate, wherein the substrate is a flexible substrate, wherein the connector comprises a RF feed terminal that is coupled to the feeding point, an input terminal that is coupled to the button input, and a ground terminal that is coupled to the grounding point.

14. The apparatus of claim 6, wherein the switch mechanism is a dome switch.

15. An electronic device comprising:
a housing; and
a circuit board disposed within the housing, wherein the circuit board comprises:
    a first circuit to power-on or power-off the electronic device; and
    a radio frequency (RF) circuit to receive data from or transmit data to another device; and
a dome switch disposed in an opening of the housing at a first side of the electronic device and the dome switch is coupled to the first circuit, wherein the dome switch comprises:
    a first electrode disposed on a substrate and coupled to the first circuit via a button trace;
    a second electrode disposed on the substrate and coupled to a ground terminal on the circuit board via a grounding trace;
    a switch disposed above at least portions of the first electrode and the second electrode; and
    a conductive trace coupled to a RF feed on the circuit board and ground trace wherein the conductive trace is directly connected to the second electrode,
wherein the RF circuit is operable to radiate or receive electromagnetic energy via an antenna element comprising the conductive trace, second electrode and ground trace.

16. The electronic device of claim 15, further comprising:
a connector disposed on the circuit board, the connector comprising an input terminal that is coupled to the first circuit, a RF terminal that is coupled to the RF feed of the RF circuit, and a ground terminal;
an RF choke disposed on the substrate between the button trace and the input terminal; and
a matching component disposed on the substrate between the conductive trace and the RF terminal.

17. The electronic device of claim 16, wherein the RF choke operates as a short circuit for button signals on the button trace within a first frequency range and as an open circuit for antenna signals on the button trace within a second frequency range, and wherein the matching component operates as an open circuit for the button signals within the first frequency range and matches an impedance of the antenna element to an impedance of the RF circuit for the antenna signals within the second frequency range.

18. The electronic device of claim 17, wherein the RF choke is an inductor and the matching component is a capacitor.

19. The electronic device of claim 17, wherein the second frequency range is approximately 2400 MHz to approximately 2500 MHz.

* * * * *